United States Patent
Mann et al.

(10) Patent No.: US 12,395,104 B2
(45) Date of Patent: Aug. 19, 2025

(54) DAMPING FILTER NETWORK HAVING A TONE DECODER CONTROLLED DAMPING SWITCH

(71) Applicant: Hamilton Sundstrand Corporation, Charlotte, NC (US)

(72) Inventors: Jaspreet Kaur Mann, Birmingham (GB); Mark A. Thomas, Solihull (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 319 days.

(21) Appl. No.: 18/064,418

(22) Filed: Dec. 12, 2022

(65) Prior Publication Data

US 2023/0188068 A1 Jun. 15, 2023

(30) Foreign Application Priority Data

Dec. 13, 2021 (EP) .................... 21275183

(51) Int. Cl.
*H02P 21/05* (2006.01)
*H02M 1/12* (2006.01)
*H02M 5/458* (2006.01)

(52) U.S. Cl.
CPC .............. *H02P 21/05* (2013.01); *H02M 1/12* (2013.01); *H02M 5/458* (2013.01)

(58) Field of Classification Search
CPC .......... H02M 1/12; H02M 5/458; H02M 1/44; H02P 21/05
See application file for complete search history.

(56) References Cited

U.S. PATENT DOCUMENTS

| | | | |
|---|---|---|---|
| 4,551,780 A | * | 11/1985 | Canay ............... H02H 7/06 363/39 |
| 9,148,048 B2 | | 9/2015 | Ekbote |
| 9,830,793 B2 | | 11/2017 | Padula |

(Continued)

FOREIGN PATENT DOCUMENTS

| | | |
|---|---|---|
| EP | 2966762 A1 | 1/2016 |
| JP | 2005117777 A | 4/2005 |

OTHER PUBLICATIONS

Abstract for JP2005117777A, Published Apr. 28, 2005, 1 page.

(Continued)

*Primary Examiner* — Jue Zhang
*Assistant Examiner* — Lakaisha Jackson
(74) *Attorney, Agent, or Firm* — CANTOR COLBURN LLP

(57) ABSTRACT

A damping filter network includes a damping filter having a damping filter resistor and a damping filter capacitor connected in series and a tone decoder having an input arranged to be connected to a system input and an output connected to a damping switch. The tone decoder has a pass-band between a lower frequency threshold and an upper frequency threshold, the damping filter resistor and the damping filter capacitor selected to perform damping at frequencies within the pass-band; wherein the tone decoder is configured to detect the frequency of the system input voltage and to close the switch so as to connect the damping filter to ground when the frequency is within the tone decoder pass-band and to open the switch to disconnect the damping filter from ground when the frequency is outside the pass-band.

9 Claims, 2 Drawing Sheets

(56) References Cited

U.S. PATENT DOCUMENTS

| | | |
|---|---|---|
| 9,977,858 B2 | 5/2018 | Solodovnik et al. |
| 10,256,757 B1 | 4/2019 | Atmur |
| 2016/0013715 A1* | 1/2016 | Patel .................... H02M 1/126 |
| | | 363/44 |

OTHER PUBLICATIONS

European Search Report for Application No. 21275183.8, mailed Jun. 3, 2022, 20 pages.
Rathnayake, et al. "Common-mode noise modelling and resonant estimation in a three-phase motor drive system: 9-150 KHz frequency range", 2020 22nd European Conference on Power Electronics and Applications, EPE Association, Sep. 7, 2020, pp. 1-10.

* cited by examiner

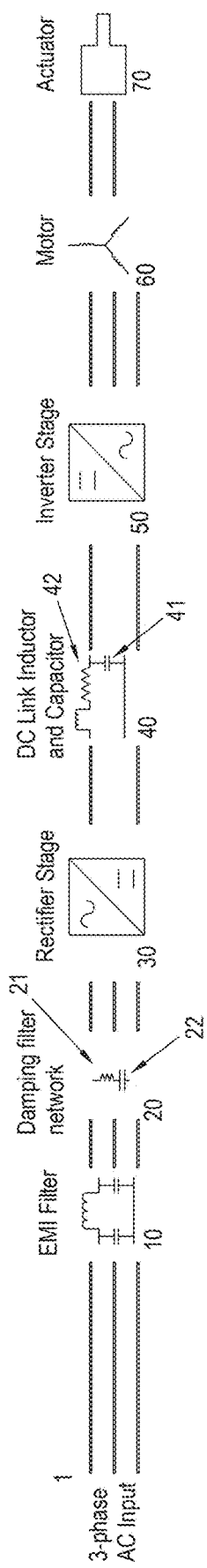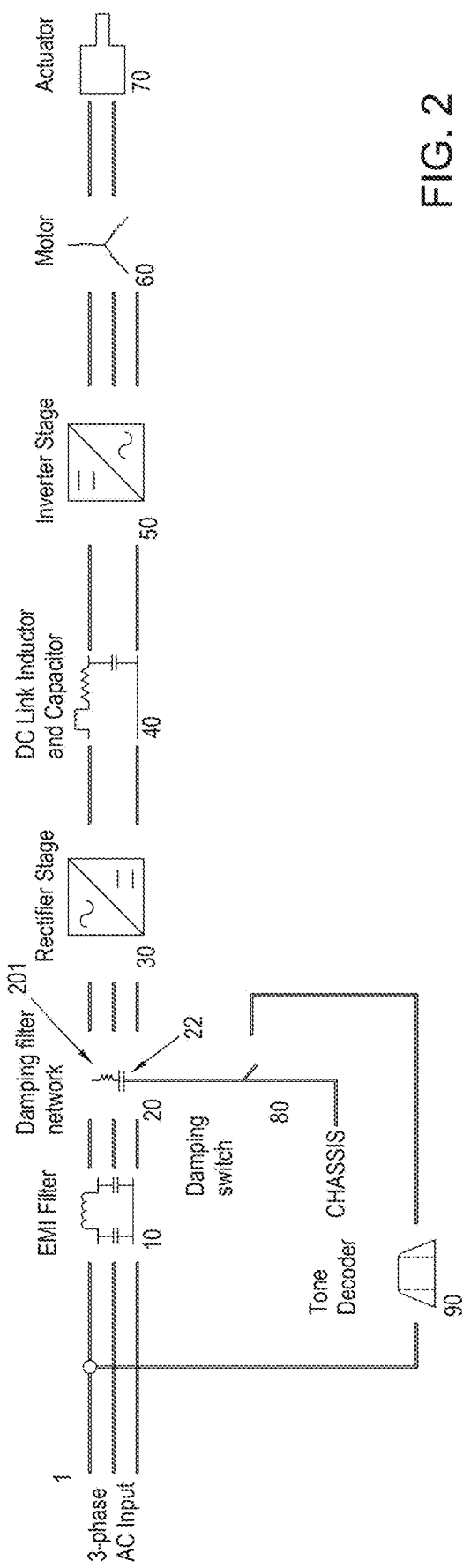
FIG. 1
PRIOR ART
FIG. 2

DAMPING FILTER NETWORK HAVING A TONE DECODER CONTROLLED DAMPING SWITCH

CROSS-REFERENCE TO RELATED APPLICATIONS

This application claims priority to European Patent Application No. 21275183.8 filed Dec. 13, 2021, the entire contents of which is incorporated herein by reference.

TECHNICAL FIELD

The present disclosure is concerned with a damping filter network for a motor drive or other power conversion system.

BACKGROUND

Motor drives and other power conversion circuits are used in various applications to convert electrical input power to a different form of output power to drive one or more loads. Power converters can convert AC input power to DC output power or can convert input AC power of a first amplitude and frequency to output AC power of a different amplitude and/or frequency. A typical motor drive includes a front end, for connection to an AC power source, a rectifier for converting the AC to DC, a DC link circuit and an inverter for converting the DC power to AC at the required amplitude and frequency to drive the load(s), which may be electro-mechanical in nature. Typically in such drives, input filters are provided between the AC source and the rectifier to control harmonics. Output filters may also be provided between the inverter and the load to suppress reflected wave voltage/current transients that are often associated with pulse width modulation (PWM) inverters. The filters are typically EMI filters. Active and passive damping may be used at the filters to deal with resonance. More specifically, a damping network in a typical motor drive is used to minimise the amplification of low frequency noise signals and the peak amplitude of the resonance frequency of the EMI filter. Active damping for the input filter, however, requires a higher control loop bandwidth to compensate for resonant frequency components.

The passive damping filter network typically consists of a resistor in series or parallel with a reactive discrete component such as a capacitor. RC or RLC circuits are commonly used for the damping filter. For high power applications such as for use in aircraft or vehicles, a damping filter network requires a high power rated resistor, a high current rated inductor and/or a high voltage rated capacitor to meet the input current or voltage requirements. Where used in harsh environmental conditions such as aircraft, systems are required to function over a wide temperature range and in high vibration environments. Such damping networks require large, expensive components and have high power requirements. These factors are, however, a disadvantage in many fields, e.g., when used in aircraft where it is important to keep the size and weight of aircraft parts to a minimum for efficiency reasons. Aircraft and automotive systems also need to comply with industry and safety standards governing the behaviour of electrical loads and equipment. Aerospace and automotive systems need to be designed to comply with, for example, DO-160G and CISPR25 which regulate, amongst other things, power quality. To comply with industry standards on power quality, whilst ensuring sufficient systems and functions can be provided on the aircraft or vehicle, it is important to design the systems to be as efficient as possible i.e. to avoid wasting energy wherever possible.

Another factor in designing energy efficient damping filter networks for aircraft and other vehicles, while bearing efficiency in mind is that until recently, on-board power sources have been 115V AC. Development is, however, now towards using a 230V AC power source instead which, for a typical damping filter network, means that the current in the damping resistor has doubled and the power dissipation has quadrupled.

There is a need for greater efficiency in the use and design of damping filters, whilst still allowing the circuit designer to demonstrate compliance with industry standards.

SUMMARY

According to one aspect, this disclosure provides a damping filter network comprising: a damping filter having a damping filter resistor and a damping filter capacitor connected in series; a tone decoder having an input arranged to be connected to a system input and an output connected to a damping switch, the tone decoder having a pass-band between a lower frequency threshold and an upper frequency threshold, the damping filter resistor and the damping filter capacitor selected to perform damping at frequencies within the pass-band; wherein the tone decoder is configured to detect the frequency of the system input voltage and to close the switch so as to connect the damping filter to ground when the frequency of the system input voltage is within the tone decoder pass-band and to open the switch to disconnect the damping filter from ground when the frequency of the system input voltage is outside the pass-band.

Also provided is a method of operating a damping filter network in a power conversion system, the method comprising sensing, by a tone decoder (90) a frequency on a voltage input line to the system and switching a damping filter network of a series connected damping resistor and damping capacitor into and out of the system depending on whether the frequency falls within or outside of a pass band of the tone decoder.

The damping filter network of the disclosure thus uses less power which, in turn, results in a reduction in power demand for the entire system.

BRIEF DESCRIPTION

Examples of a damping filter network according to the disclosure will now be described. It should be noted that variations of these examples are possible within the scope of the claims.

FIG. 1 is a block diagram of a typical motor drive in a power and control system.

FIG. 2 is a block diagram of a motor drive incorporating a damping filter network according to this disclosure.

DETAILED DESCRIPTION

Figure 3:
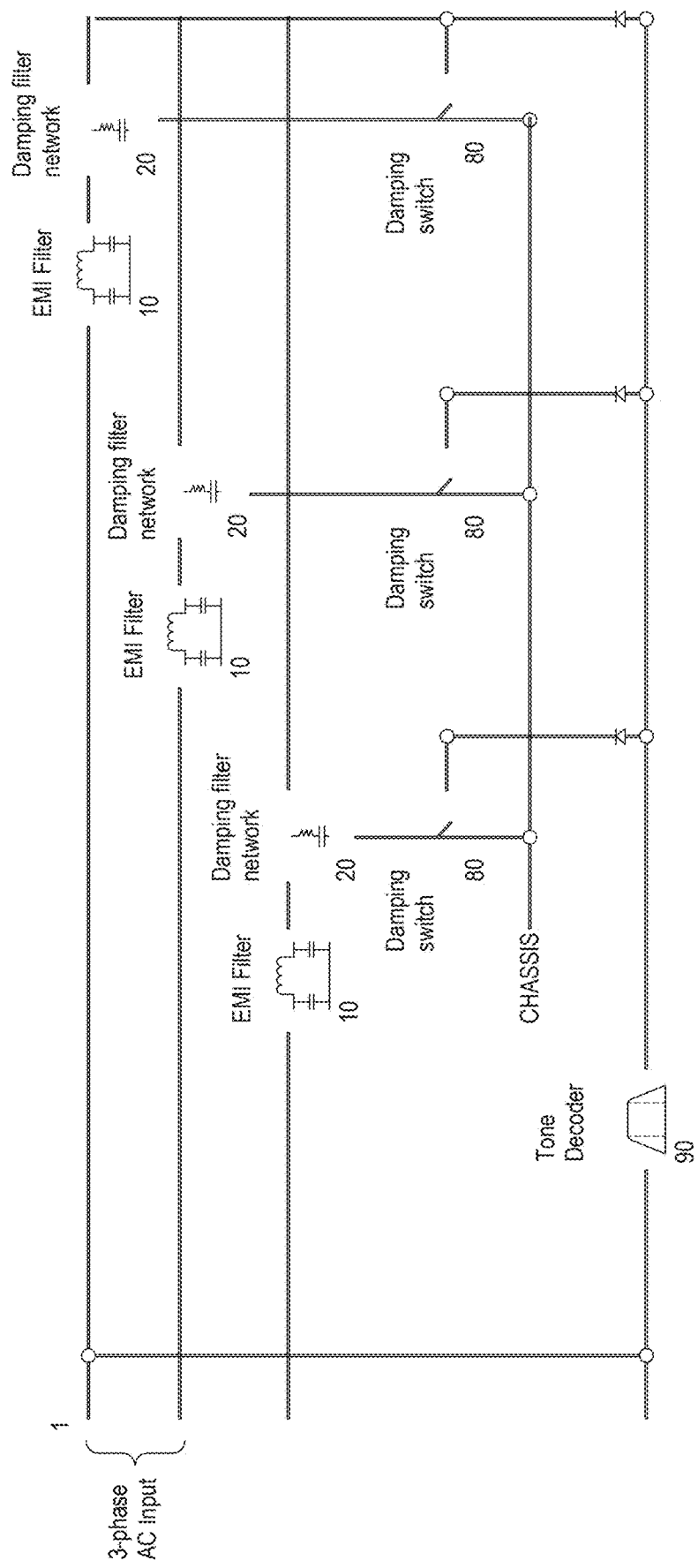
FIG. 3 is a more detailed diagram of a damping filter network according to the disclosure for a three-phase system.

Referring first to FIG. 1, a conventional power conversion circuit or motor drive, with a damping filter network, will be briefly described.

Power from a three-phase AC input 1 (e.g. a 115V AC supply or a 230V AC supply, but other sources may also be used) converted by the motor drive and power converter to a three-phase AC voltage of suitable amplitude and frequency to drive a load such as a motor 60, which may then drive another load e.g. an actuator 70.

The input AC voltage 1 is usually filtered by an input filter e.g. an EMI filter 10 to remove harmonics and transients before it is passed to a rectifier stage 30 where the AC voltage is converted to DC voltage. A DC circuit 40, typically including a DC link capacitor 41 connected across the DC bus as well as a DC link choke or inductors 42. The DC link output is then converted to an appropriate AC output by means of an inverter stage 50. An output filter (not shown) may also be provided between the inverter 50 and the load 60. To reduce damage to the system due to external low frequency oscillations and/or transients a damping filter network 20 is provided at the input (and/or output) filter. FIG. 1 shows only an input filter and associated damping filter network, for simplicity. Such a motor drive system is well-known and will not be described in further detail.

As mentioned above, to effectively damp voltage and current harmonics and transients that can occur in typical operation of a motor drive, a damping filter network may require high power series-connected resistors 21 and high voltage rated capacitors 22, which add to the overall size and cost of the system.

Although the damping filter is required to damp low frequency transients appearing at the AC input source, such transients do not occur often. The damping filter needs to damp the harmonics and transients when they do occur, but conventionally, this large circuit block is constantly powered on to deal with an event that only happens occasionally. In existing designs, for most of the time the damping filter network is connected in circuit, it is not actually performing any useful function and is purely in a standby state. This results in the damping filter network being very inefficient from a power requirement point of view.

The damping filter network according to the present disclosure addresses this inefficiency by enabling the damping filter to be switched out when it is not required, so that it is not using power unless it is needed to suppress low frequency harmonics or transients. This results in large power savings for the damping filter network and, therefore, also for the entire system and this becomes more significant when considering the move towards 230V AC source. Also, by operating the damping filter network in a more power-efficient manner, more power may be available for other functions.

An additional important advantage of the disclosure is that smaller size damping filter network components may be used, thus saving space and cost. The modification of the disclosure also provides a means for power thermal management of the system.

Referring to FIG. 2, all parts of the motor drive system are the same as in FIG. 1 except for the damping filter network. Therefore, the same reference numerals are used for those parts and they will not be described again here.

As with the conventional system, the damping filter network 200 is placed in parallel with a filter (input and/or output filter—here with an input EMI filter 10) and has a conventional structure including e.g. series-connected resistors 201 and capacitor 202. In addition, to control the operation of the damping components, the network includes a tone decoder 90 and a switch 80.

The tone decoder 90 is an active device which will output a voltage to operate the illustrated switches at or above certain frequencies. Such devices are known, for example, from audio applications. The tone decoder 90 is connected to the AC input and determines the supply frequency at which the filter damping switches will be activated. As all three input phases will have the same frequency, it is only necessary for the decoder 90 to be connected to one of the three phase lines, although a decoder could also be connected to the other phase lines if desired (e.g. for redundancy). The output of the decoder is connected to the switch 80. The switch 80 is grounded. In one example, the switch may be grounded via the vehicle chassis, but variations in grounding topology are possible.

FIG. 4 shows an example having a damping filter network including a tone decoder and switch for each input phase line. The principles of operation are the same for the arrangement of FIG. 2 and FIG. 3.

The operation of the damping filter network of this disclosure will now be described.

As with the conventional system, the system is connected to a three-phase AC input 1 that is EMI filtered 10 to prevent electromagnetic interference affecting the system. The filtered AC input is then rectified by the rectifier stage 30 to provide a DC output that charges the DC link capacitor 41 of the DC link stage 40. The DC link capacitor regulates high voltage DC and acts as an energy storage component in the event of any power interruptions. The DC output is then converted to 3-phase AC output by the inverter stage 50 (which can be any suitable inverter design) to drive the motor 60 which, in this example, then rotates an actuator 70. The motor drive may, of course, have other applications.

The tone decoder 90 is selected to have a pass-band frequency that includes the resonance frequency of the EMI filter and some frequencies either side of the resonance frequency but excludes frequencies that are higher and lower than the resonance frequency by a predetermined margin. For example, the pass-band may be set to one decade above and below the resonance frequency of the associated filter 10. The damping filter components 201, 202 are selected to operate in the pass-band frequency of the tone decoder 90.

The tone decoder 90 is connected to the AC input and continuously monitors its frequency. If the AC input frequency is outside of the tone decoder pass-band, the tone decoder output is not enabled. In that case, no power is provided to the switch 80 and the switch is, therefore OFF and the damping filter network 200 is left unconnected from the rest of the system.

When, however, the AC input frequency falls within the pass-band of the decoder 90, the decoder output switches the switch ON (closes the switch) and the damping filter network is connected across the EMI filter 10 and is therefore operatively connected into the system.

Thus, the decoder is set to pass frequencies based on the resonance frequency of the associated filter to switch the damping filter on and cause it to operate in the system when the detected input frequency indicates that damping is required, but keeps the damping filter network OFF when the input frequency indicates that it is not required.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A damping filter network comprising:
a damping filter having a damping filter resistor and a damping filter capacitor connected in series; and
a tone decoder having an input arranged to be connected to a system input voltage and an output connected to a damping switch, the tone decoder having a pass-band between a lower frequency threshold and an upper frequency threshold, the damping filter resistor and the damping filter capacitor selected to perform damping at frequencies within the pass-band;
wherein the tone decoder is configured to detect a frequency of the system input voltage and to close the damping switch so as to connect the damping filter to ground when the frequency of the system input voltage is within the tone decoder pass-band and to open the switch to disconnect the damping filter from ground when the frequency of the system input voltage is outside the pass-band;
wherein the tone decoder pass-band is set to one decade above and below a resonance frequency of an EMI filter connected, in use, to the damping filter network.

2. A power conversion system comprising:
an AC input source;
power conversion components; and
an end stage providing an output to drive a load;
wherein the power conversion circuit further includes:
a damping filter network as claimed in claim 1 connected to the AC input source.

3. The power conversion system as claimed in claim 2, wherein the power conversion components include a rectifier stage and an inverter stage and the output is an AC voltage output.

4. The power conversion system as claimed in claim 3, further comprising a DC link between the rectifier stage and the inverter stage.

5. The power conversion system as claimed in claim 3, further comprising:
an output EMI filter between the inverter stage and the output, wherein the tone decoder pass-band is set to one decade above and below the resonance frequency of the output EMI filter.

6. The power conversion system as claimed in claim 3, wherein the AC input source is a 115 V AC source or a 230 V AC source.

7. The power conversion system as claimed in claim 3, wherein the AC input source is a three phase source and the damping filter network is connected to one of the input phase lines.

8. The power conversion system as claimed in claim 3, wherein the AC input source is a three phase source and the damping network includes a damping filter network connected to each of the input phase lines.

9. A method of operating a damping filter network in a power conversion system, the method comprising:
detecting, by a tone decoder a frequency on a voltage input line to the system; and
switching a damping filter circuit of a series connected damping resistor and damping capacitor into and out of the system depending on whether the frequency falls within or outside of a pass band of the tone decoder, wherein the tone decoder pass-band is set to one decade above and below a resonance frequency of an EMI filter connected, in use, to the damping filter network.

* * * * *